(12) United States Patent
Samie et al.

(10) Patent No.: US 10,359,104 B2
(45) Date of Patent: Jul. 23, 2019

(54) INTEGRATED SELECTABLE ONE WAY CLUTCH AND TORQUE CONVERTER ENGINE DISCONNECT

(71) Applicant: GM GLOBAL TECHNOLOGY OPERATIONS LLC, Detroit, MI (US)

(72) Inventors: Farzad Samie, Franklin, MI (US); Derek F. Lahr, Howell, MI (US)

(73) Assignee: GM Global Technology Operations LLC., Detroit, MI (US)

( * ) Notice: Subject to any disclaimer, the term of this patent is extended or adjusted under 35 U.S.C. 154(b) by 133 days.

(21) Appl. No.: 15/617,728

(22) Filed: Jun. 8, 2017

(65) Prior Publication Data
US 2018/0355963 A1    Dec. 13, 2018

(51) Int. Cl.
*F16H 45/02* (2006.01)
*F16D 41/08* (2006.01)
*F16D 41/12* (2006.01)
*F16H 41/24* (2006.01)

(52) U.S. Cl.
CPC ........... *F16H 45/02* (2013.01); *F16D 41/125* (2013.01); *F16H 41/24* (2013.01)

(58) Field of Classification Search
CPC .. F16H 41/00–41/32; F16H 2045/0252; F16H 45/00–2045/0294
See application file for complete search history.

(56) References Cited

U.S. PATENT DOCUMENTS

| | | | | |
|---|---|---|---|---|
| 3,848,410 | A  * | 11/1974 | Kinoshita | F16H 41/04 60/347 |
| 8,042,670 | B2 * | 10/2011 | Bartos | F16D 41/16 192/43.1 |
| 2017/0328456 | A1* | 11/2017 | Samie | F16D 1/104 |

* cited by examiner

*Primary Examiner* — Charles A Fox
*Assistant Examiner* — Lillian T Nguyen
(74) *Attorney, Agent, or Firm* — Quinn IP Law

(57) ABSTRACT

A powertrain includes an engine having a crankshaft. The engine is operable to rotate the crankshaft about a central axis. A torque converter includes a housing that is rotatable about the central axis. A selectable one way clutch system interconnects the housing of the torque converter and the crankshaft. The selectable one way clutch system includes a notch plate and a pocket plate. One of the notch plate and the pocket plate is defined by the housing of the torque converter, and the other of the notch plate and the pocket plate is connected to the crankshaft for continuous rotation with the crankshaft.

20 Claims, 4 Drawing Sheets

INTEGRATED SELECTABLE ONE WAY CLUTCH AND TORQUE CONVERTER ENGINE DISCONNECT

INTRODUCTION

The disclosure generally relates to a powertrain for a vehicle.

Vehicles often include an engine that is coupled to a transmission through a torque converter. The engine generates torque that is applied to the transmission. The torque converter is a fluid coupling that transmits torque from the engine to the transmission. Some hybrid vehicles include an electric motor that is coupled to the transmission through the torque converter. The electric motor may generate torque that is applied to the transmission through the torque converter, or may receive torque through the torque converter for generating electricity. Some hybrid vehicle operating modes require that the engine be disconnected from the transmission, while electric motor is providing torque to the transmission, or receiving torque through the driveline.

SUMMARY

A powertrain is provided. The powertrain includes an engine having a crankshaft. The engine is operable to rotate the crankshaft about a central axis. A torque converter includes a housing that is rotatable about the central axis. A selectable one way clutch system interconnects the housing of the torque converter and the crankshaft. The selectable one way clutch system includes a notch plate and a pocket plate. One of the notch plate and the pocket plate is defined by the housing of the torque converter, and the other of the notch plate and the pocket plate is connected to the crankshaft for continuous rotation with the crankshaft.

In one embodiment of the powertrain, the housing forms the notch plate and the pocket plate is connected to the crankshaft for continuous rotation with the crankshaft. In another embodiment of the powertrain, the housing forms the pocket plate and the notch plate is connected to the crankshaft for continuous rotation with the crankshaft.

In one aspect of the powertrain, the torque converter includes a turbine that is rotatable about the central axis, and the housing of the torque converter includes a pump. The pump and the turbine cooperate to provide a fluid coupling therebetween for transmitting torque between the pump and the turbine.

In another aspect of the powertrain, a flex plate is attached to the crankshaft. The flex plate interconnects one of the notch plate or the pocket plate with the crankshaft for continuous rotation with the crankshaft.

In one embodiment of the powertrain, a damper system is attached to the flex plate. The damper system is operable to damp rotational vibration from the crankshaft. The damper system may include a damper plate that is connected to the flex plate via a plurality of damper springs. The damper plate is connected to one of the notch plate or the pocket plate for continuous rotation with the crankshaft, and connects the one of the notch plate or the pocket plate to the crankshaft.

In one aspect of the powertrain, the selectable one way clutch system includes a plurality of struts that are disposed between the notch plate and the pocket plate. The pocket plate includes a plurality of wells disposed annularly about the central axis, with each one of the plurality of wells supporting one of the plurality of struts. The notch plate includes a plurality of depressions disposed annularly about the central axis. The plurality of depressions are operable to engage the plurality of struts to communicate torque therebetween.

In another aspect of the powertrain, the selectable one way clutch system includes a selector plate. The selector plate is concentric with and disposed between the notch plate and the pocket plate. The selector plate is rotatably moveable between a first mode position, a second mode position and a third mode position for selectively moving the plurality of struts into and out of interlocking engagement with the notch plate and the pocket plate. The plurality of struts engage the notch plate and the pocket plate in interlocking engagement for transmitting torque between the notch plate and the pocket plate in a first rotational direction when the selector plate is disposed in the first mode position. The plurality of struts are disengaged from the notch plate to allow the pocket plate to freewheel relative to the notch plate when the selector plate is disposed in the second mode position. The plurality of struts engage the notch plate and the pocket plate in interlocking engagement for transmitting torque between the notch plate and the pocket plate in a second rotational direction, which is opposite the first rotational direction, when the selector plate is disposed in the third mode position.

In another aspect of the powertrain, the selectable one way clutch system includes an actuator plate that is concentric with and disposed between the selector plate and the pocket plate. The actuator plate is operable to move the selector plate between the first mode position, the second mode position, and the third mode position.

In one embodiment of the powertrain, an electric device is coupled to the housing of the torque converter in torque communication therebetween. The electric device may include, but is not limited to, an electric motor and/or an electric generator. In one embodiment of the powertrain, an exterior circumferential surface of the housing of the torque converter is shaped to form gear teeth, which are disposed in meshing engagement with a gear train of the electric device.

A torque converter is also provided. The torque converter includes a housing and a turbine. The turbine is concentric with the housing. A pump is attached to the housing and cooperates with the turbine to form a fluid coupling therebetween. The housing includes a plurality of recesses integrally formed into the housing. The plurality of recesses are operable to engage a plurality of struts of a selectable one way clutch system. As such, the housing supports the pump and is operable as a component of the selectable one way clutch system.

Accordingly, the housing of the torque converter, in addition to supporting the pump of the torque converter, is formed to be either the notch plate or the pocket plate of the selectable one way clutch system. By using the housing of the torque converter as a component of the selectable one way clutch system, the axial length of the powertrain along the central axis is minimized.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Referring to the FIGS., wherein like numerals indicate like parts throughout the several views, a powertrain for a vehicle is generally shown at 20. The vehicle may include any moveable platform, including but not limited to a car, a truck, a train, an ATV, a plane, a boat, etc.

Figure 1:
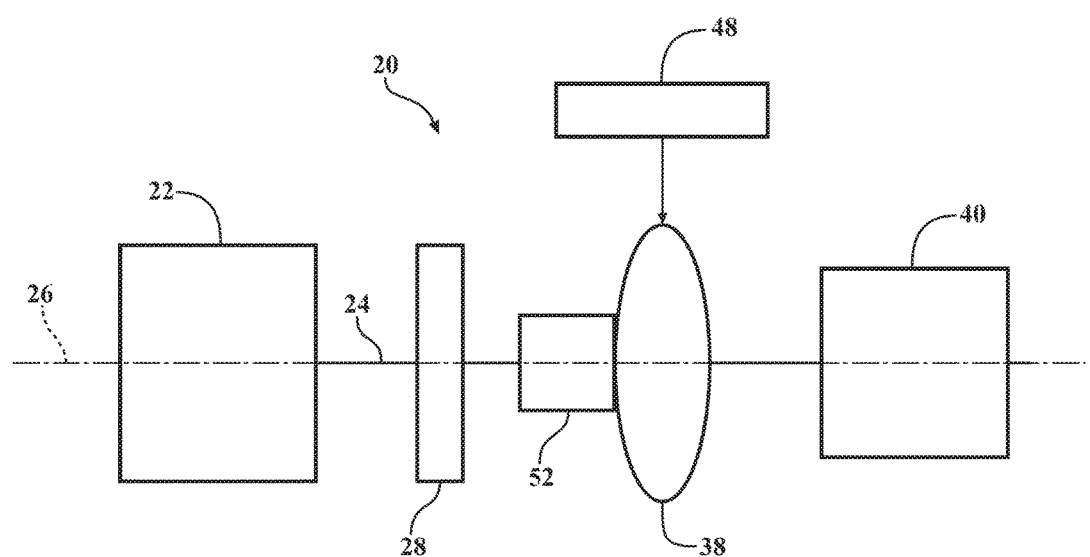
FIG. 1 is a schematic plan view of a powertrain for a vehicle.

Referring to FIG. 1, the powertrain 20 includes an engine 22. The engine 22 may include, but is not limited to, an internal combustion engine 22, such as a gasoline engine 22 or a diesel engine 22. The engine 22 is operable to generate torque as is known in the art. The engine 22 includes a crankshaft 24, which is operable to rotate about a central axis 26. The specific type, style, configuration and operation of the engine 22 is not pertinent to the teachings of this disclosure, and are therefore not described in detail herein.

Figure 2:
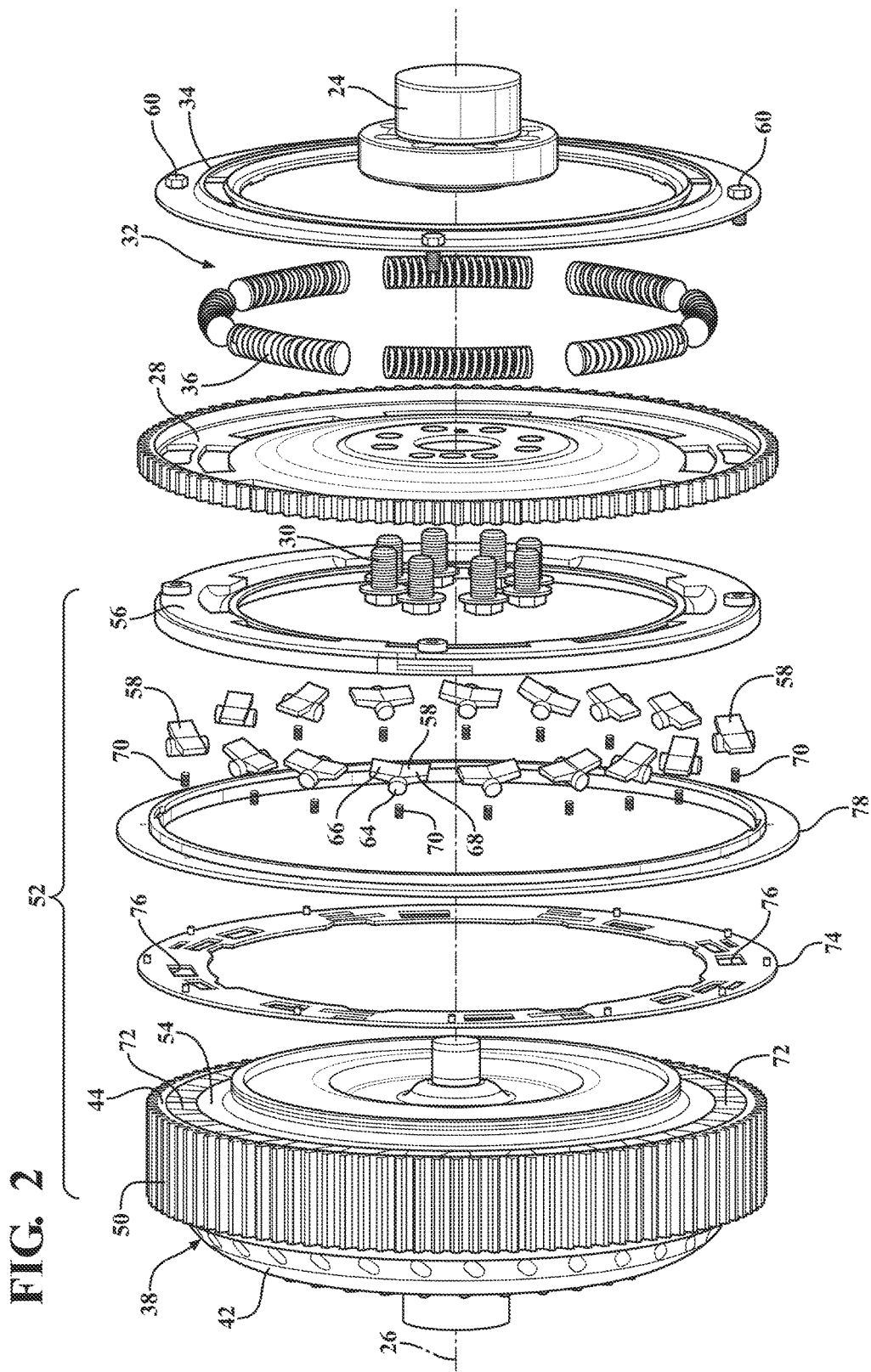
FIG. 2 is a schematic partial exploded perspective view of the powertrain.

Referring to FIG. 2, a flex plate 28 may be attached to the crankshaft 24. The flex plate 28 may be attached to the crankshaft 24 in any suitable manner. For example, a plurality of bolts 30 may attach the flex plate 28 to the crankshaft 24. The flex plate 28 may include a damper system 32. The damper system 32 is attached to the flex plate 28, and is operable to damp rotational vibration from the crankshaft 24. Generally, the damper system 32 includes a damper plate 34 that is connected to the flex plate 28 via a plurality of damper springs 36. The specific configuration and operation of the flex plate 28 and the damper system 32 are not pertinent to the teachings of this disclosure, are well known to those skilled in the art, and are therefore not described in detail herein.

Figure 3:
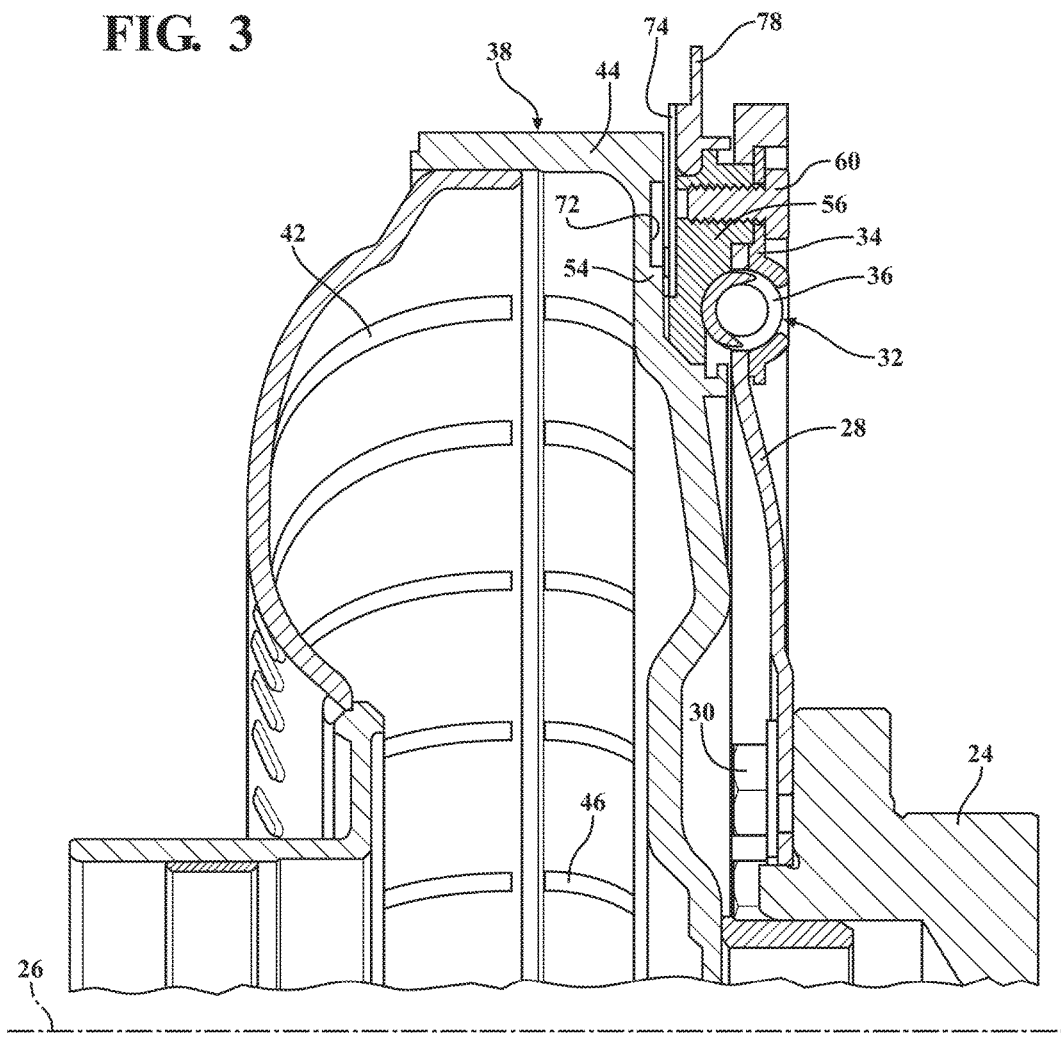
FIG. 3 is a schematic partial cross sectional view of the powertrain.

Referring to FIG. 1, the powertrain 20 includes a torque converter 38 for transferring torque from the engine 22 to a transmission 40. Referring to FIG. 2, the torque converter 38 includes a turbine 42 and a housing 44 rotatable about the central axis 26. As shown in FIG. 3, the housing 44 of the torque converter 38 includes a pump 46. The pump 46 and the turbine 42 cooperating to provide a fluid coupling therebetween for transmitting torque between the pump 46 and the turbine 42 as is known in the art. The specific operation of the fluid coupling between the pump 46 and the turbine 42 of the torque converter 38 are not pertinent to the teachings of this disclosure, are well known to those skilled in the art, and are therefore not described in detail herein.

Referring to FIG. 1, the powertrain 20 may further include an electric device 48. The electric device 48 may include, but is not limited to, an electric motor and/or a generator. The electric device 48 is coupled to the torque converter 38 for communicating torque therebetween. For example, as shown in FIG. 2, the housing 44 of the torque converter 38 includes an outer exterior wall having a plurality of radially outwardly projecting splines or teeth 50. The teeth 50 on the outer exterior wall of the housing 44 are configured to mate with a gear train coupled to the electric device 48 for transmitting torque between the housing 44 of the torque converter 38 and the electric device 48. It should be appreciated that the housing 44 of the torque converter 38 and the electric device 48 may be connected in torque communication in some other manner not shown or described herein.

Referring to FIG. 1, a selectable one way clutch system 52 interconnects the housing 44 of the torque converter 38 and the crankshaft 24. Referring to FIG. 2, the selectable one way clutch system 52 includes a notch plate 54, a pocket plate 56 and a plurality of struts 58 disposed between the notch plate 54 and the pocket plate 56. The housing 44 of the torque converter 38 is shaped to form one of the notch plate 54 or the pocket plate 56, and the other of the notch plate 54 and the pocket plate 56 is connected to the crankshaft 24 for continuous rotation with the crankshaft 24. In the exemplary embodiment shown in FIG. 2, the housing 44 of the torque converter 38 forms the notch plate 54, and the pocket plate 56 is connected to the crankshaft 24. Specifically, as shown in the exemplary embodiment of FIG. 2, the pocket plate 56 is directly attached to the damper plate 34 via a plurality of fasteners 60, with the damper plate 34 being attached to the flex plate 28. The flex plate 28 is in turn directly connected to the crankshaft 24, thereby connecting the pocket plate 56 to the crankshaft 24 for rotation with the crankshaft 24. In the exemplary embodiment shown in FIG. 4, the housing 44 of the torque converter 38 forms the pocket plate 56, and the notch plate 54 is connected to the crankshaft 24. Specifically, as shown in the exemplary embodiment of FIG. 4, notch plate 54 is directly attached to the damper plate 34 via the plurality of fasteners 60, with the damper plate 34 being attached to the flex plate 28. The flex plate 28 is in turn directly connected to the crankshaft 24, thereby connecting the notch plate 54 to the crankshaft 24 for rotation with the crankshaft 24.

The selectable one way clutch system 52 is capable of transmitting torque between a first member, e.g., the crankshaft 24, and a second member, e.g., the housing 44 of the torque converter 38, in a first rotational direction only, in a second rotational direction only (opposite the first rotational direction), or may alternatively disallow torque transmission 40 between the first member and the second member, i.e., allow the first member and the second member to freewheel relative to each other.

Figure 4:
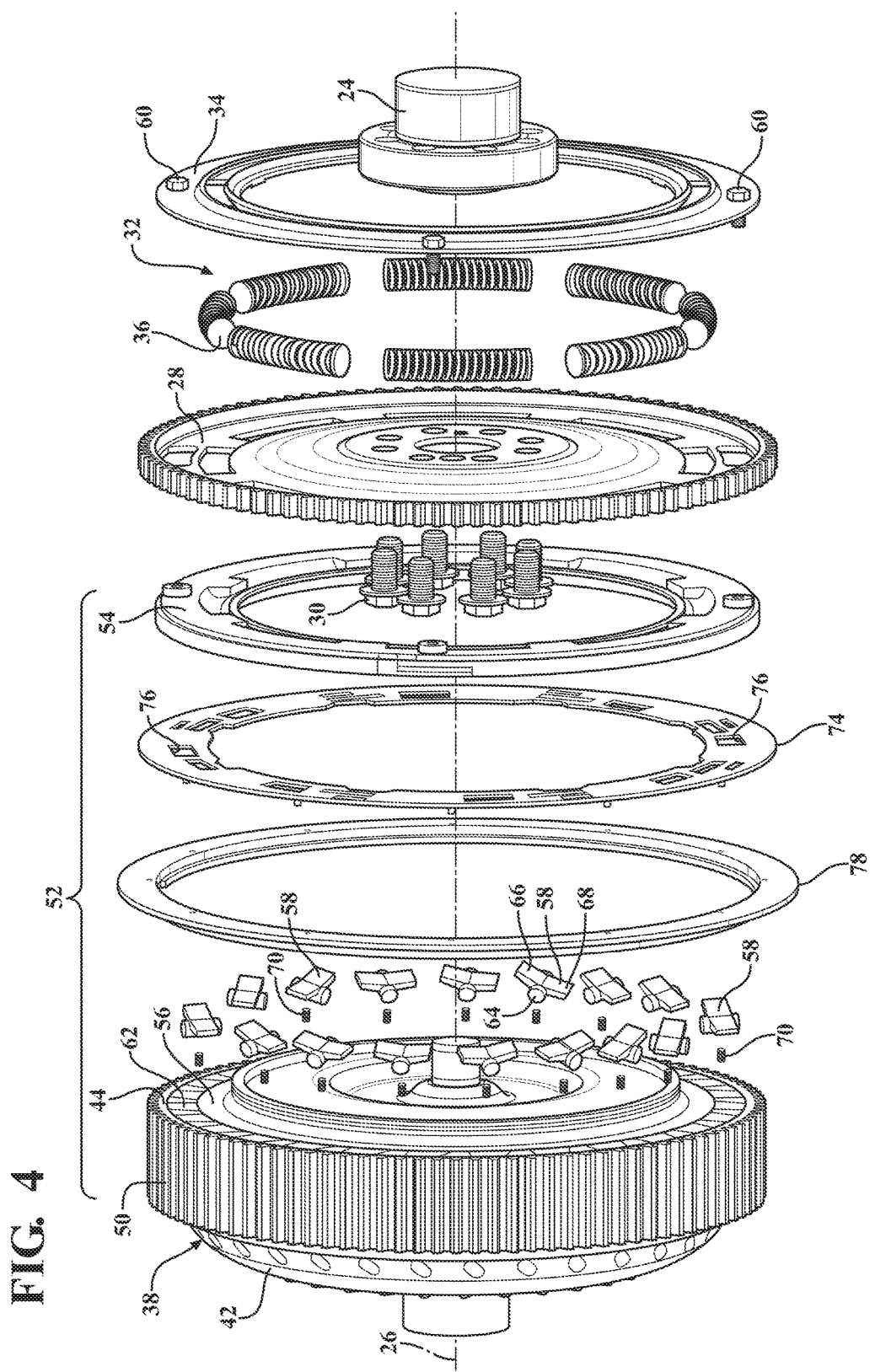
FIG. 4 is a schematic partial exploded perspective view of an alternative embodiment of the powertrain.

Referring to FIGS. 2 and 3, the pocket plate 56 is concentric with the notch plate 54 about the central axis 26. As noted above, the notch plate 54 is formed by the housing 44 of the torque converter 38. As such, the notch plate 54 is an integral part of the housing 44 of the torque converter 38, and is not a separate component fastened to the housing 44 of the torque converter 38. By using the housing 44 of the torque converter 38 to form the notch plate 54, (or the pocket plate 56 as shown in FIG. 4), the housing 44 of the torque converter 38 supports the pump 46 of the torque converter 38, as well as functions as a component of the selectable one way clutch system 52. By forming the housing 44 of the torque converter 38 to include the features of one of the components of the selectable one way clutch system 52, the number of components of the powertrain 20 is reduced, and the axial length of the powertrain 20 along the central axis 26 is minimized.

The pocket plate 56 defines a plurality of wells 62 disposed annularly about and radially spaced equidistant from the central axis 26. Each of the plurality of wells 62 supports one of the plurality of struts 58. The plurality of struts 58 is disposed between the notch plate 54 and the pocket plate 56. Each of the plurality of struts 58 includes a central pivot portion 64 having a generally cylindrical body, a first wing portion 66 and a second wing portion 68. The first wing portion 66 extends outward from the central pivot portion 64, with the second wing portion 68 extending outward from the central pivot portion 64 in an opposite direction, yet generally planar with the first wing portion 66. A strut spring 70 is disposed within each of the plurality of wells 62 between the pocket plate 56 and one of the first wing portion 66 and the second wing portion 68 to bias one of the first wing portion 66 and the second wing portion 68 outward away from the pocket plate 56, and thereby causing the other of the first wing portion 66 and the second wing portion 68 to pivot about the central pivot portion 64 and inward toward the pocket plate 56.

The notch plate 54 defines a plurality of depressions 72, similar in shape and size to the plurality of wells 62 defined by the pocket plate 56. Each of the plurality of depressions 72 is aligned with one of the plurality of struts 58. Accordingly, when one of the first wing portions 66 or the second wing portions 68 of the struts 58 are biased outwardly away from the pocket plate 56, the first wing portions 66 or the second wing portions 68 engage the depressions 72 to transmit torque between the notch plate 54 and the pocket plate 56.

As noted above, the housing 44 of the torque converter 38 is formed to define the features of either the notch plate 54 or the pocket plate 56, and thereby operate as a component of the selectable one way clutch system 52. Accordingly, the housing 44 includes a plurality of recesses integrally formed into the housing 44. If the housing 44 is formed to define the notch plate 54, such as shown in FIG. 2, then the recesses in the housing 44 operate or function as the depressions 72 of the notch plate 54, as described above. If the housing 44 is formed to define the pocket plate 56, such as shown in FIG. 4, then the recesses in the housing 44 operate or function as the wells 62 of the pocket plate 56, as described above.

Referring to FIG. 2, a selector plate 74 is disposed between the notch plate 54 and the pocket plate 56, and is concentric with the notch plate 54 and the pocket plate 56 about the central axis 26. The selector plate 74 defines a plurality of windows 76, with each of the plurality of windows 76 aligning with one of the plurality of struts 58. The windows 76 allow the first wing portions 66 or the second wing portions 68 of the struts 58 to extend through the selector plate 74 and engage the depressions 72 of the notch plate 54 in interlocking engagement.

The selector plate 74 is rotatably moveable about the central axis 26 between a first mode position, a second mode position and a third mode position. The selector plate 74 rotates between the first mode position, the second mode position and the third mode position to selectively move the plurality of struts 58 into and out of interlocking engagement with the notch plate 54 and the pocket plate 56.

When the selector plate 74 is disposed in the first mode position, the first wing portions 66 of the struts 58 are positioned to extend through the windows 76 of the selector plate 74 and engage the notch plate 54 in interlocking engagement for transmitting torque in a first rotational direction. When in the first mode position, the notch plate 54 may freewheel relative to the pocket plate 56 in the second rotational direction. As such, torque may only be transmitted in the first rotational direction. Accordingly, the plurality of struts 58 engage the notch plate 54 and the pocket plate 56 in interlocking engagement for transmitting torque between the notch plate 54 and the pocket plate 56 in the first rotational direction when the selector plate 74 is in the first mode position. When the selector plate 74 is disposed in the second mode position, both the first wing portions 66 and the second wing portions 68 are positioned to not extend through the windows 76 of the selector plate 74, thereby allowing the pocket plate 56 and the notch plate 54 to freewheel relative to each other, and not transmit a torque between the pocket plate 56 and the notch plate 54. Accordingly, the plurality of struts 58 is disengaged from the notch plate 54 to allow the notch plate 54 to freewheel relative to the pocket plate 56 when the selector plate 74 is in the second mode position. When the selector plate 74 is disposed in the third mode position, the second wing portions 68 of the struts 58 are positioned to extend through the windows 76 of the selector plate 74 and engage the notch plate 54 in interlocking engagement for transmitting torque in a second rotational direction, which is opposite the first rotational direction. When in the third mode position, the notch plate 54 may freewheel relative to the pocket plate 56 in the first rotational direction. As such, torque may only be transmitted in the second rotational direction. Accordingly, the plurality of struts 58 engage the notch plate 54 and the pocket plate 56 in interlocking engagement for transmitting torque between the notch plate 54 and the pocket plate 56 in the second rotational direction when the selector plate 74 is in the third mode position.

The selectable one way clutch system 52 includes an actuator for moving the selector plate 74 between the first mode position, the second mode position, and the third mode position. The actuator may include any device that is capable of moving the selector plate 74 between the first mode position, the second mode position, and the third mode position. For example, in the exemplary embodiment shown in FIG. 2 and described herein, the actuator includes an actuator plate 78. The actuator plate 78 is concentric with and disposed between the selector plate 74 and the pocket plate 56. The actuator plate 78 is operable to move the selector plate 74 between the first mode position, the second mode position, and the third mode position. The actuator plate 78 may be connected to a mode selector (not shown), that is operable to control a position the actuator plate 78, which thereby moves the selector plate 74 between the respective mode positions. The specific configuration and operation of the actuator and/or the actuator plate 78 are not pertinent to the teachings of this disclosure, are well known to those skilled in the art, and are therefore not described in detail herein.

It should be appreciated that the first direction may include either a clockwise direction or a counterclockwise direction, and that the second direction will include the other of the clockwise direction and the counterclockwise direction. For example, if the first direction is defined as a clockwise direction, then the first mode position transmits torque between the notch plate 54 and the pocket plate 56 in a clockwise direction, and the third mode position transmits torque between the notch plate 54 and the pocket plate 56 in the counterclockwise direction.

The selectable one way clutch system 52 described above and shown in FIGS. 2 and 3 is an exemplary embodiment of the selectable one way clutch system 52. As such, it should be appreciated that the selectable one way clutch system 52 may be configured and operate other than shown and described herein. Accordingly, the scope of the claims should not be limited to the exemplary embodiment of the selectable one way clutch system 52 shown and described herein.

As described above, the powertrain 20 may include both the engine 22 and the electric device 48, e.g., an electric motor. During some operating modes of the powertrain 20, it may be desirable to disconnect torque communication between the engine 22 and the torque converter 38. By positioning the selectable one way clutch system 52 in the second mode position, no torque is communicated between the engine 22 and the housing 44 of the torque converter 38, thereby allowing the electric device 48 to power the powertrain 20 without input or losses from the engine 22.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

What is claimed is:

1. A powertrain comprising:
   an engine having a crankshaft, and operable to rotate the crankshaft about a central axis;
   a torque converter having a housing rotatable about the central axis; and
   a selectable one way clutch system interconnecting the housing of the torque converter and the crankshaft, wherein the selectable one way clutch system includes a notch plate and a pocket plate, with one of the notch plate and the pocket plate defined by the housing of the torque converter, and the other of the notch plate and the pocket plate connected to the crankshaft for continuous rotation with the crankshaft.

2. The powertrain set forth in claim 1, wherein the torque converter includes a turbine rotatable about the central axis, and wherein the housing of the torque converter includes a pump, whereby the pump and the turbine cooperate to provide a fluid coupling therebetween for transmitting torque between the pump and the turbine.

3. The powertrain set forth in claim 1, further comprising a flex plate attached to the crankshaft, and interconnecting one of the notch plate or the pocket plate with the crankshaft for continuous rotation with the crankshaft.

4. The powertrain set forth in claim 3, further comprising a damper system attached to the flex plate and operable to damp rotational vibration from the crankshaft.

5. The powertrain set forth in claim 4, wherein the damper system includes a damper plate connected to the flex plate via a plurality of damper springs, with the damper plate connected to one of the notch plate or the pocket plate for continuous rotation with the crankshaft.

6. The powertrain set forth in claim 1, wherein the selectable one way clutch system includes a plurality of struts disposed between the notch plate and the pocket plate.

7. The powertrain set forth in claim 6, wherein, the pocket plate includes a plurality of wells disposed annularly about the central axis, with each one of the plurality of wells supporting one of the plurality of struts.

8. The powertrain set forth in claim 7, wherein the notch plate includes a plurality of depressions disposed annularly about the central axis, wherein the plurality of depressions are operable to engage the plurality of struts to communicate torque therebetween.

9. The powertrain set forth in claim 8, wherein the selectable one way clutch system includes a selector plate concentric with and disposed between the notch plate and the pocket plate, wherein the selector plate is rotatably moveable between a first mode position, a second mode position and a third mode position for selectively moving the plurality of struts into and out of interlocking engagement with the notch plate and the pocket plate.

10. The powertrain set forth in claim 9, wherein the selectable one way clutch system includes an actuator plate concentric with and disposed between the selector plate and the pocket plate, and operable to move the selector plate between the first mode position, the second mode position, and the third mode position.

11. The powertrain set forth in claim 1, further comprising an electric device coupled to the housing of the torque converter in torque communication therebetween.

12. The powertrain set forth in claim 1, wherein the housing forms the notch plate and the pocket plate is connected to the crankshaft for continuous rotation with the crankshaft.

13. The powertrain set forth in claim 1, wherein the housing forms the pocket plate and the notch plate is connected to the crankshaft for continuous rotation with the crankshaft.

14. A powertrain for a vehicle, the powertrain comprising:
   an engine having a crankshaft, and operable to rotate the crankshaft about a central axis;
   a torque converter having a turbine and a housing rotatable about the central axis, wherein the housing of the torque converter includes a pump, with the pump and the turbine cooperating to provide a fluid coupling therebetween for transmitting torque between the pump and the turbine;
   an electric device coupled to the housing of the torque converter such that the electric device and the housing of the torque converter are operable to transmit torque therebetween;
   a selectable one way clutch system interconnecting the housing of the torque converter and the crankshaft, wherein the selectable one way clutch system includes a notch plate, a pocket plate and a plurality of struts disposed between the notch plate and the pocket plate;
   a selector plate concentric with and disposed between the notch plate and the pocket plate, wherein the selector plate is rotatably moveable between a first mode position, a second mode position and a third mode position for selectively moving the plurality of struts into and out of interlocking engagement with the notch plate and the pocket plate;
   wherein the plurality of struts engage the notch plate and the pocket plate in interlocking engagement for transmitting torque between the notch plate and the pocket plate in a first rotational direction when the selector plate is disposed in the first mode position, the plurality of struts are disengaged from the notch plate to allow the pocket plate to freewheel relative to the notch plate when the selector plate is disposed in the second mode position, and wherein the plurality of struts engage the notch plate and the pocket plate in interlocking engagement for transmitting torque between the notch plate and the pocket plate in a second rotational direction, which is opposite the first rotational direction, when the selector plate is disposed in the third mode position; and
   wherein one of the notch plate and the pocket plate is defined by the housing of the torque converter, and the other of the notch plate and the pocket plate connected to the crankshaft for continuous rotation with the crankshaft.

15. The powertrain set forth in claim 14, wherein the housing forms the notch plate and the pocket plate is connected to the crankshaft for continuous rotation with the crankshaft.

16. The powertrain set forth in claim 14, wherein the housing forms the pocket plate and the notch plate is connected to the crankshaft for continuous rotation with the crankshaft.

17. The powertrain set forth in claim 14, further comprising a flex plate attached to the crankshaft, and interconnecting one of the notch plate or the pocket plate with the crankshaft for continuous rotation with the crankshaft.

18. The powertrain set forth in claim 17, further comprising damper system attached to the flex plate and operable to damp rotational vibration from the crankshaft.

19. The powertrain set forth in claim 18, wherein the damper system includes a damper plate connected to the flex plate via a plurality of damper springs, with the damper plate connected to one of the notch plate or the pocket plate for continuous rotation with the crankshaft.

20. A torque converter comprising:
 a housing;
 a turbine concentric with the housing;
 a pump attached to the housing and cooperating with the turbine to form a fluid coupling therebetween; and
 wherein the housing includes a plurality of recesses integrally formed into the housing and operable to engage a plurality of struts of a selectable one way clutch system, whereby the housing supports the pump and is operable as a component of the selectable one way clutch system.

* * * * *